US009327902B2

(12) United States Patent
Ogawa (10) Patent No.: US 9,327,902 B2
(45) Date of Patent: May 3, 2016

(54) CONVEYOR VEHICLE AND CONVEYOR METHOD

(75) Inventor: Kazuhiko Ogawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 249 days.

(21) Appl. No.: 13/816,963

(22) PCT Filed: Mar. 3, 2011

(86) PCT No.: PCT/JP2011/054894
§ 371 (c)(1),
(2), (4) Date: Feb. 14, 2013

(87) PCT Pub. No.: WO2012/029339
PCT Pub. Date: Mar. 8, 2012

(65) Prior Publication Data
US 2013/0142600 A1 Jun. 6, 2013

(30) Foreign Application Priority Data
Aug. 31, 2010 (JP) ................................. 2010-194660

(51) Int. Cl.
*B65G 1/00* (2006.01)
*B65G 1/06* (2006.01)
*B65G 1/04* (2006.01)

(52) U.S. Cl.
CPC ................ *B65G 1/06* (2013.01); *B65G 1/0492* (2013.01); *B65G 1/065* (2013.01)

(58) Field of Classification Search
CPC ......................................................... B60P 9/00
USPC ................................ 414/277, 278, 555, 751.1
See application file for complete search history.

(56) References Cited

U.S. PATENT DOCUMENTS

| 4,597,710 A * | 7/1986 | Kovats ........................... 414/409 |
| 4,723,532 A * | 2/1988 | Osojnak .......................... 124/78 |
| 2001/0046430 A1* | 11/2001 | Bayne ............................ 414/408 |

(Continued)

FOREIGN PATENT DOCUMENTS

| JP | 10-087023 A | 4/1998 |
| JP | 11-278607 A | 10/1999 |

(Continued)

OTHER PUBLICATIONS

Official Communication issued in International Patent Application No. PCT/JP2011/054894, mailed on Jun. 14, 2011.

*Primary Examiner* — Saul Rodriguez
*Assistant Examiner* — Willie Berry, Jr.
(74) *Attorney, Agent, or Firm* — Keating & Bennett, LLP (57) ABSTRACT

A transfer vehicle includes a lateral pair of extendable and retractable arms, openable and closable hooks at front and rear ends of the arms, an arm opening and closing mechanism configured to change spacing between the arms, and a controller configured and programmed to control the arms and the arm opening and closing mechanism as well as the hooks. During article pickup, the controller pulls in an article onto the transfer vehicle by causing the arms to protrude to a position beyond the article in a state in which the hooks at a distal end in a pickup direction as viewed from the transfer vehicle are opened, thereafter closing the hooks to clamp the article, opening the arms after the clamping to provide a gap between the article and at least one of the arms, and retracting the arms in a state in which the hooks are closed.

9 Claims, 9 Drawing Sheets

(56) References Cited

U.S. PATENT DOCUMENTS

2008/0089764 A1* 4/2008 Vistro ............................ 414/408
2008/0279666 A1* 11/2008 Rathbun et al. ............... 414/555

FOREIGN PATENT DOCUMENTS

| JP | 2002-068406 A | 3/2002 |
| JP | 2005-219833 A | 8/2005 |

* cited by examiner

CONVEYOR VEHICLE AND CONVEYOR METHOD

BACKGROUND OF THE INVENTION

1. Field of the Invention

The present invention relates to transfer vehicles, and particularly to a transfer vehicle configured to transfer an article to and from racks without the article getting caught on the arms of the transfer vehicle.

2. Description of the Related Art

JP H11-278607A discloses a transfer vehicle including a lateral pair of arms and configured to transfer an article to and from racks by causing hooks at front and rear ends of the arms to abut the article. JP H11-278607A also discloses adjusting the spacing between the arms by moving the arms along the running direction of the transfer vehicle. However, the inventors of the present application discovered that clamping an article with arms to position the article may cause the article to get caught on the arms, resulting in damage to the article. However, if a gap is provided between the article and the arms to avoid this problem, the position to which the article is transferred becomes imprecise. Therefore, there is a need for a technique for transferring an article to a predetermined position without the article getting caught on the arms.

SUMMARY OF THE INVENTION

Preferred embodiments of the present invention provide a transfer vehicle that pulls an article onto the transfer vehicle without the article getting caught on arms and while positioning the article.

Preferred embodiments of the present invention also provide a transfer vehicle that prevents an article from being displaced on the transfer vehicle or from protruding from the transfer vehicle.

Preferred embodiments of the present invention provide a transfer vehicle that drops an article off to a precise position without the article getting caught on the arms.

According to a preferred embodiment of the present invention, a transfer vehicle includes a lateral pair of extendable and retractable arms, the arms each including openable and closable hooks at front and rear ends of the arms, an arm opening and closing mechanism configured to change spacing between the arms, and a controller configured and programmed to control the arms, the arm opening and closing mechanism and the hooks, the controller and programmed being configured to, during article pickup, control hooks at a distal end along a pickup direction as viewed from the transfer vehicle in a state in which the hooks are opened, while controlling the arms such that the arms are advanced so as to protrude from the transfer vehicle to a position where the hooks at the distal end pass the article, control the arm opening and closing mechanism by closing the advanced arms so as to clamp the article and opening the arms after the clamping, such that a gap is provided between the article and at least one of the arms, and control the hooks at the distal ends to be in a closed state in order to pull the article onto the transfer vehicle, while controlling the arms such that the arms are retracted.

The hooks at the distal end may be closed between the clamping of the article and the start of pulling the article. Both of the arms may be movable along the running direction of the transfer vehicle, or only one of the arms may be movable.

According to a preferred embodiment of the present invention, the article is clamped by the arms before the article is pulled in, and therefore the article is positioned relative to the arms. From this state, the arms are opened to cause the hooks at the distal end to abut the arms, thus pulling the article. Accordingly, the article does not get caught on the arms, or in other words, the arms do not damage the article by strongly hitting the article.

Preferably, the controller is configured and programmed to control the arm opening and closing mechanism such that the article is clamped by the arms while the transfer vehicle is running.

This makes it possible to significantly reduce and prevent the displacement, vibration and the like of the article during running.

Also preferably, the controller is configured and programmed to control the hooks at the front and rear ends such that the hooks are closed while the transfer vehicle is running. This makes it possible to prevent the article from protruding from the transfer vehicle during running, and particularly to prevent falling off of the article. Although the operation of closing the hooks is performed under control of the controller, the hooks may alternatively be closed automatically upon completion of retraction of the arms, without an instruction from the controller.

Particularly preferably, the controller is configured to, during article drop off, control the arm opening and closing mechanism to provide a gap between at least one of the arms and the article, control the hooks at a proximal end along a drop off direction as viewed from the transfer vehicle in a state in which the hooks are closed, and control the arms such that the arms are advanced so as to protrude from the transfer vehicle. This prevents the article from getting caught on the arms during article drop off. Note that clamping the article by the arms during running allows the article to be pre-positioned relative to the transfer vehicle, so that the article may be dropped off at the target position of the racks even if a gap is provided between the article and the arms during article drop off. Even if the article is not clamped during running, temporarily clamping the article at the time of pulling the article onto the transfer vehicle allows the article to be pre-positioned relative to the transfer vehicle. Therefore, in either case, the article may be dropped off at a precise position.

Another preferred embodiment of the present invention provides a transfer method for transferring an article using a transfer vehicle including openable and closable hooks at front and rear ends thereof, and also including a lateral pair of extendable and retractable arms and a controller, the method including the steps of advancing, during article pickup, the arms so as to protrude from the transfer vehicle in a state in which the hooks at a distal end along a pickup direction as viewed from the transfer vehicle, to a position at which the hooks at the distal end pass the article; subsequently closing the arms to clamp the article; and, after the clamping, pulling the article onto the transfer vehicle by opening the arms to provide a gap between the article and at least one of the arms, and further retracting the arms in a state in which the hooks at the distal end are closed, wherein the steps are performed under control of a controller.

Preferably, during article drop off, a step of advancing the arms so as to protrude from the transfer vehicle in a state where a gap is provided between at least one of the arms and where the article and the hooks at a proximal end along a drop off direction as viewed from the transfer vehicle are closed is performed under control of the controller.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following describes preferred embodiments of the present invention. The scope of the present invention is based on the claims, and is intended to be determined in accordance with the understanding of a person skilled in the art with reference to the description of the present invention and related art in the field of the present invention.

FIGS. 1 to 13 show a transfer vehicle 4 according to a preferred embodiment of the present invention and its operation. The transfer vehicle 4 runs between a pair of right and left racks 6 and 7. For example, the racks 6 and 7 are provided with their respective running rails 8, and the transfer vehicle 4 runs on the running rails 8 by wheels 9 and a running motor 10 of the transfer vehicle 4. In this preferred embodiment, the racks 6 and 7 are provided in multiple stages in the height direction, and a transfer vehicle 4 is provided for each stage. However, for example, the transfer vehicle 4 may be provided with an elevation frame such that the transfer vehicle 4 may transfer articles to and from a plurality of racks located at different levels of height. It is sufficient that the rack 6, 7 is provided at at least one of the right and left sides of the transfer vehicle 4. The transfer vehicle 4 and the racks 6 and 7 collectively constitute an automated warehouse 2.

Figure 1:
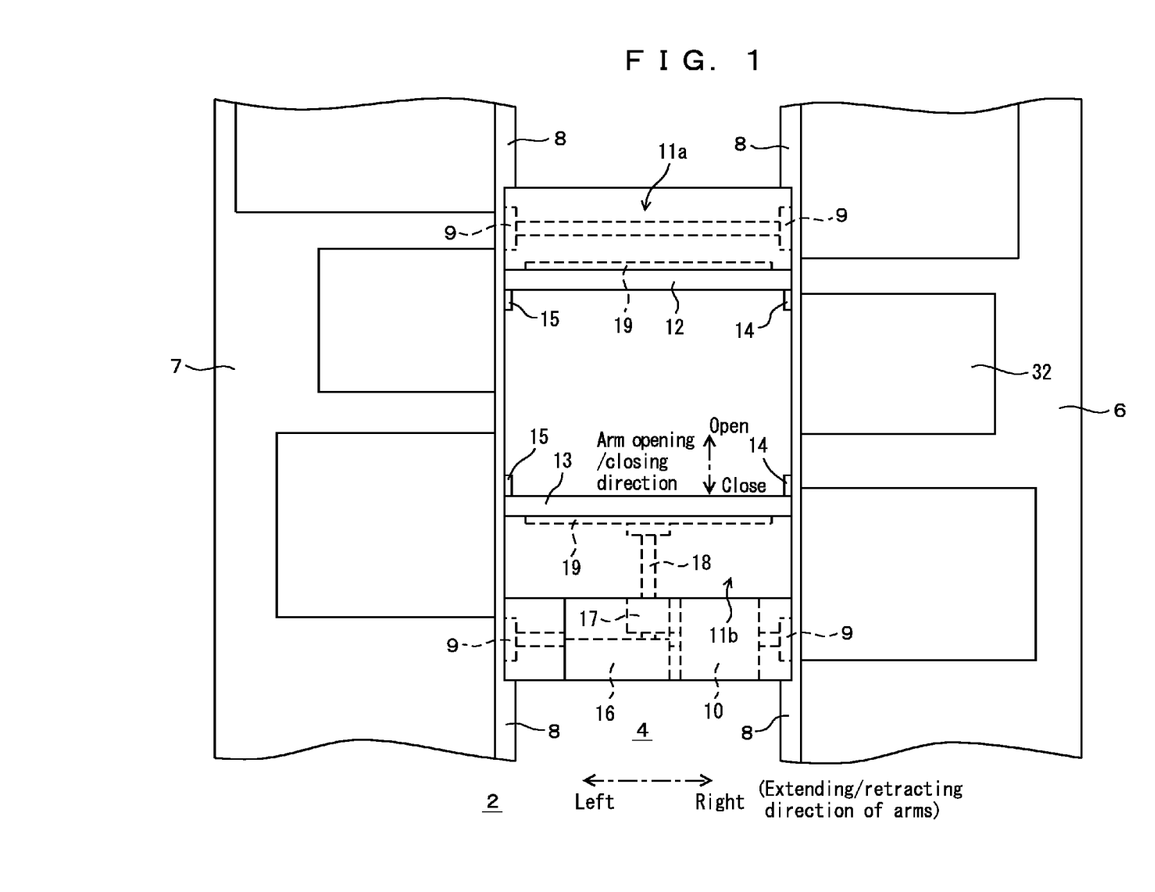
FIG. 1 is a plan view showing a transfer vehicle and right and left racks according to a preferred embodiment of the present invention.

The transfer vehicle 4 includes a lateral pair of arm extending and retracting mechanisms 11a and 11b, and reference numerals 12 and 13 denote their respective top arms. Each of the arms 12 and 13 is provided with a pair of hooks 14 and 15 at front and rear ends thereof. Note that the front-rear direction of the arms refers to the right-left direction as viewed from the transfer vehicle 4. Also, the direction in which the spacing between the top arms 12 and 13 is changed is referred to as the opening and closing direction of the arms (the running direction of the transfer vehicle 4), and the right-left direction of the transfer vehicle 4 is referred to as the extending and retracting direction of the arms. Although the arm extending and retracting mechanisms 11a and 11b are three-stage arms configured to move middle arms 19 relative to the base and move the top arms 12 and 13 relative to the middle arms 19, they may alternatively be two-stage or four-stage arms, for example. Reference numeral 16 denotes an arm opening and closing motor, an example of the arm opening and closing mechanism, configured to change the spacing between the top arms 12 and 13 by advancing or retracting the arm extending and retracting mechanism 11b along the running direction of the transfer vehicle 4. Alternatively, both the arm extending and retracting mechanisms 11a and 11b may be advanced or retracted along the running direction of the transfer vehicle 4. Reference numeral 17 denotes a nut that is fixed to the arm extending and retracting mechanism 11b. An arm opening and closing motor 16 moves the arm extending and retracting mechanism 11b by rotating a screw shaft 18 meshed with the nut 17.

Figure 2:
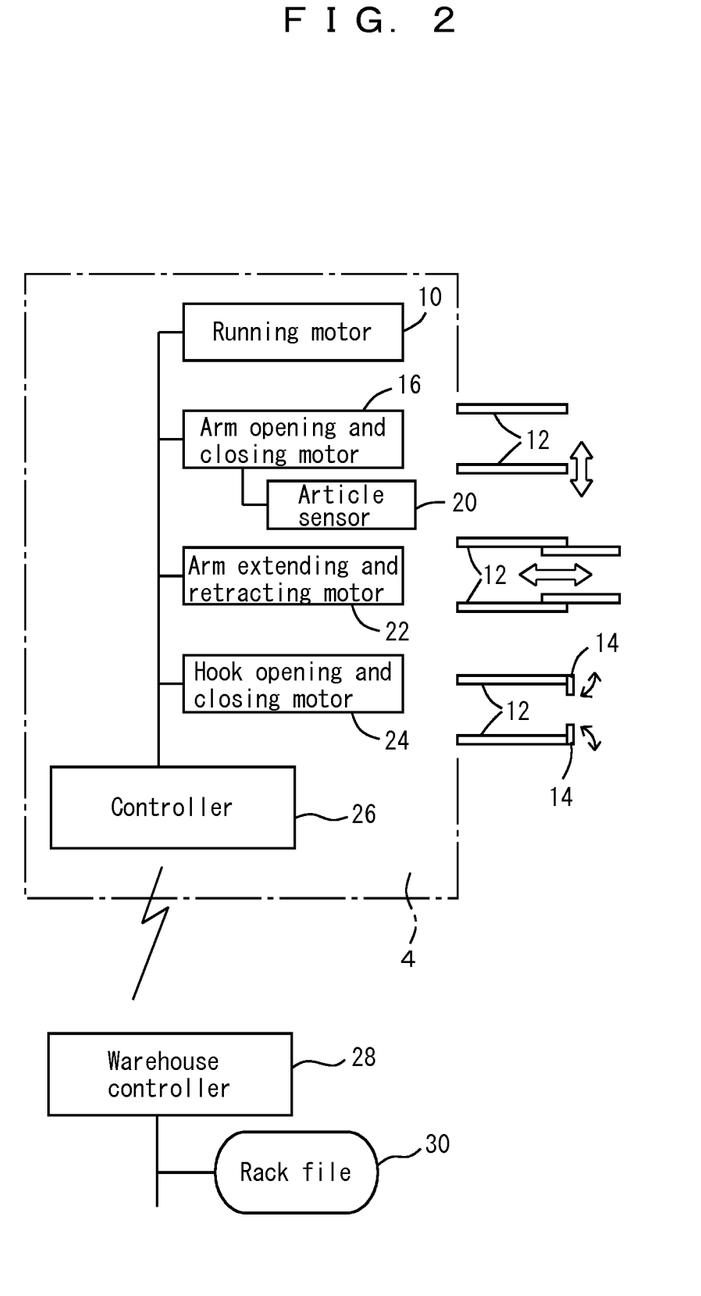
FIG. 2 is a block diagram of a controller and a motor of the transfer vehicle and a warehouse controller.

FIG. 2 shows a control system of the transfer vehicle 4, and a controller 26 of the transfer vehicle 4 controls the running motor 10, the arm opening and closing motor 16, an arm extending and retracting motor 22, and a hook opening and closing motor 24. An arm extending and retracting motor 22 is provided for each of the arm extending and retracting mechanisms 11a and 11b. A hook opening and closing motor 24 is provided for each of the four hooks 14, 14, 15, and 15 such that the hooks 14 and 15 are opened or closed. A package sensor 20 detects whether the top arms 12 and 13 have clamped a package. For example, the package sensor 20 detects whether there is a sudden increase in the output torque upon contact with the package when the arm opening and closing motor 16 is closed at a constant velocity. Alternatively, the package sensor 20 detects whether there is a sudden decrease in the rotational speed of the arm opening and closing motor 16 upon contact with the package when the motor 16 is driven at a constant current.

Figure 3:
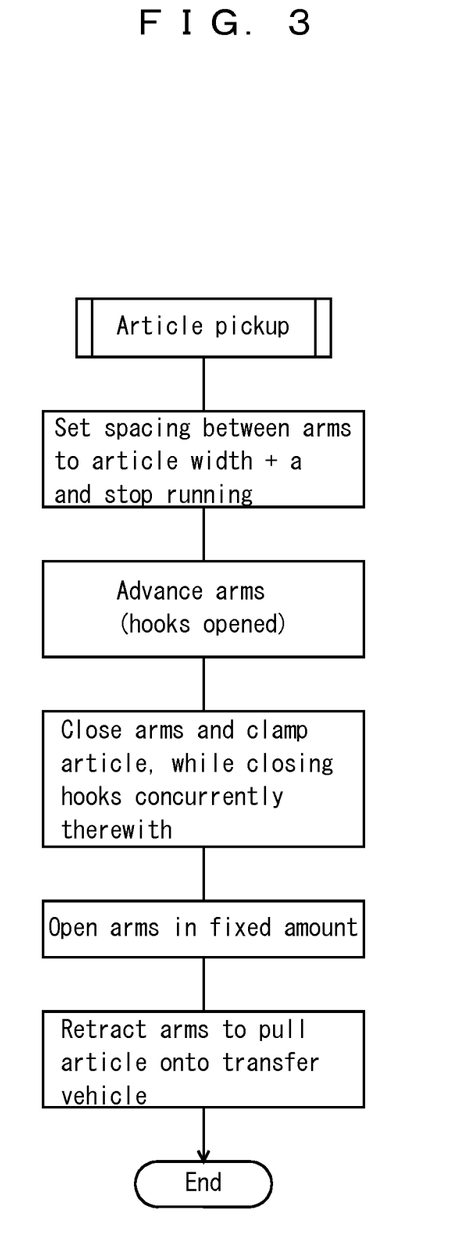
FIG. 3 is a flowchart illustrating an algorithm used for performing article pickup according to a preferred embodiment of the present invention.

In accordance with the algorithms shown in FIG. 3 and the subsequent drawing, the controller 26 controls the running motor 10, the arm opening and closing motor 16, the arm extending and retracting motor 22, and the hook opening and closing motor 24. The controller communicates with the warehouse controller 28, which performs overall control of the automated warehouse 2, and receives an instruction regarding transfer of articles from the warehouse controller 28. The warehouse controller 28 includes a rack file 30. The rack file 30 stores what size package is present in which location of the racks 6 and 7, stores the proximal end position of a package along the length of the racks as the position of the package, and stores the size of the package and the width and depth of the package along the length of the racks. In addition to these, the rack file 30 stores the ID and the like of packages. Based on the data stored in the rack file 30, the controller 26 may know what width package is picked up at which location. Further, when a package has been dropped off, the controller 26 reports the proximal end position of the package that has been dropped off and the width, the ID or the like of the package to the warehouse controller 28, and the warehouse controller 28 updates the rack file 30 according to this data. The width of the package need not be reported.

Figure 4:
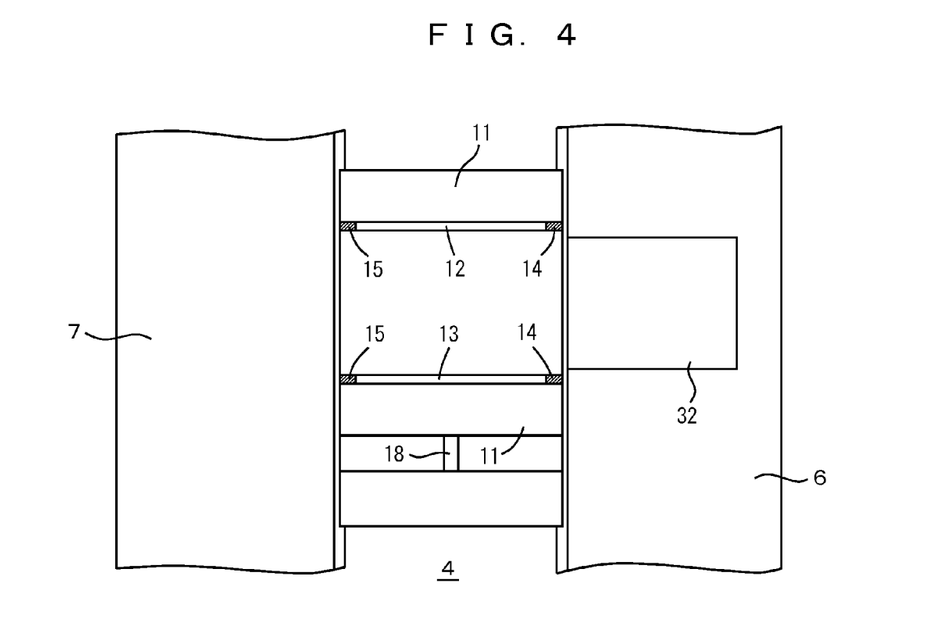
FIG. 4 is a plan view showing the transfer vehicle having stopped at a pickup position.

FIG. 3 shows an algorithm used to perform article pickup, and FIGS. 4 to 8 schematically show an operation of the top arms 12 and 13. The algorithm shown in FIG. 3 is executed under control of the controller 26. The transfer vehicle is notified of the proximal end position along the length of the racks 6 and 7 of a package 32 to be picked up and the width of the package 32 from the warehouse controller, and stops at a position suitable for performing article pickup. At this time, the spacing between the top arms 12 and 13 is set to be slightly larger than the package width, both the hooks 14 and 15 are opened, and at least the hooks 14, which are located on the package 32 side (the distal end side), are opened. The allowance for the spacing between the top arms 12 and 13 with respect to the package width is, for example, about 5 mm to about 30 mm (FIG. 4).

Figure 5:
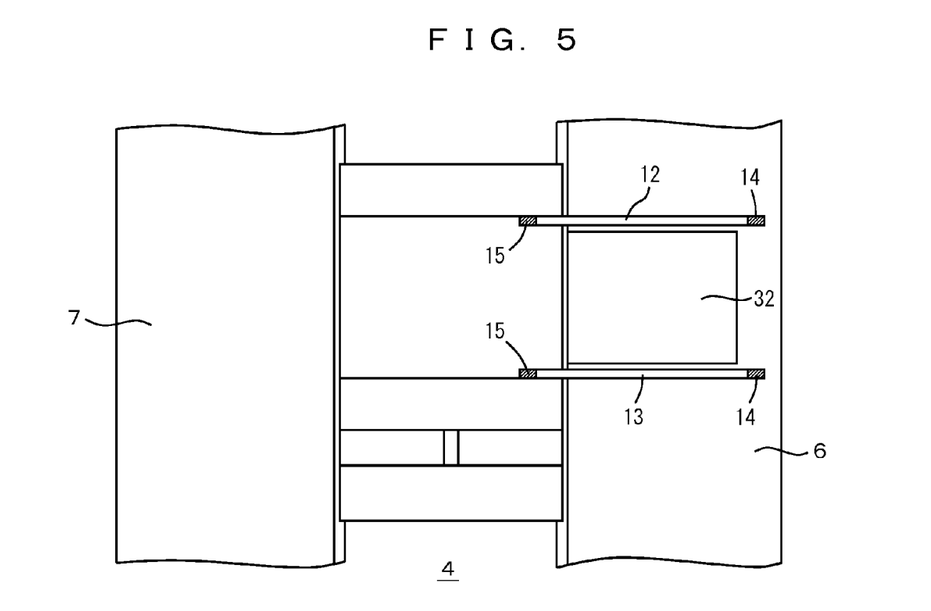
FIG. 5 is a plan view showing the transfer vehicle having stretched its arms.
Figure 6:
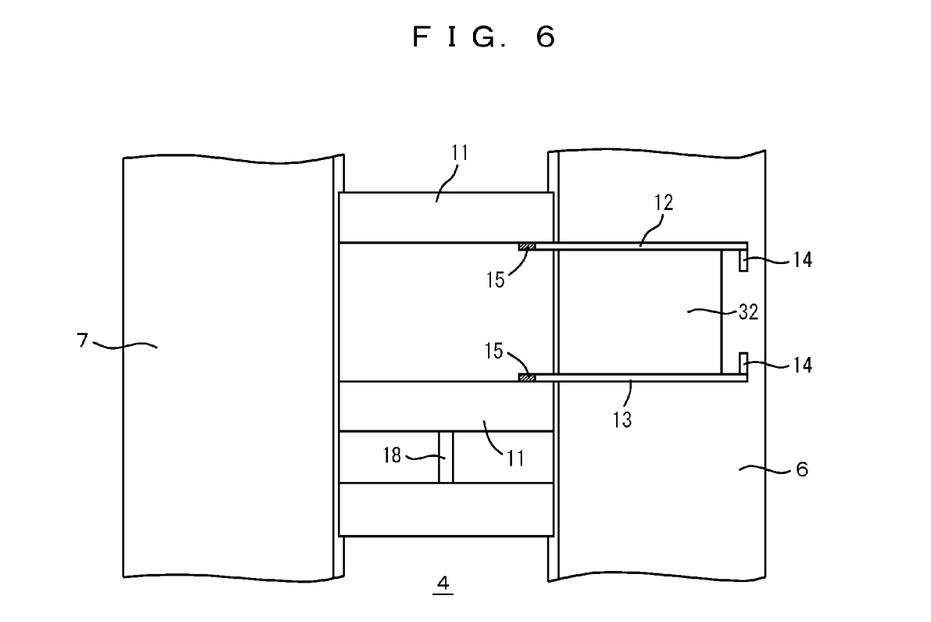
FIG. 6 is a plan view showing the transfer vehicle closing the arms to clamp an article.

Upon stoppage of the transfer vehicle 4, the top arms 12 and 13 are advanced so as to protrude from the transfer vehicle 4. At this time, the spacing between the top arms 12 and 13 is larger than the width of the package 32, and therefore the arms 12 and 13 and the package 32 will not get caught on one another (FIG. 5). Then, as shown in FIG. 6, the spacing between the top arms 12 and 13 is narrowed so as to clamp the package 32. Then, when clamping is detected by the package sensor, the arm opening and closing motor is stopped so as to prevent an excessive pressure from being applied to the package. Concurrently therewith, for example, at least the hooks 14 at the distal end in the drop off direction are closed (FIG. 6).

Figure 7:
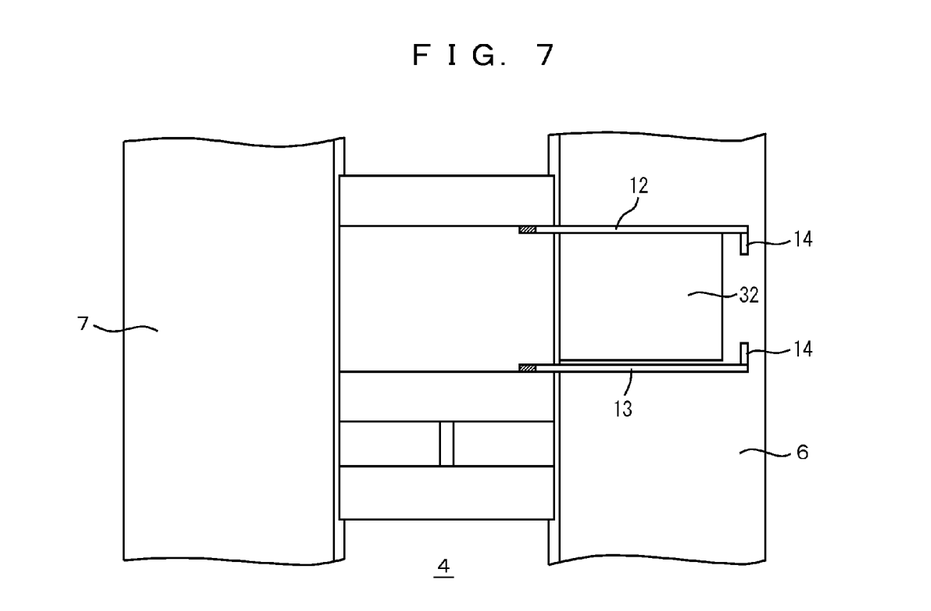
FIG. 7 is a plan view showing the transfer vehicle opening the arms to start pulling the article.
Figure 8:
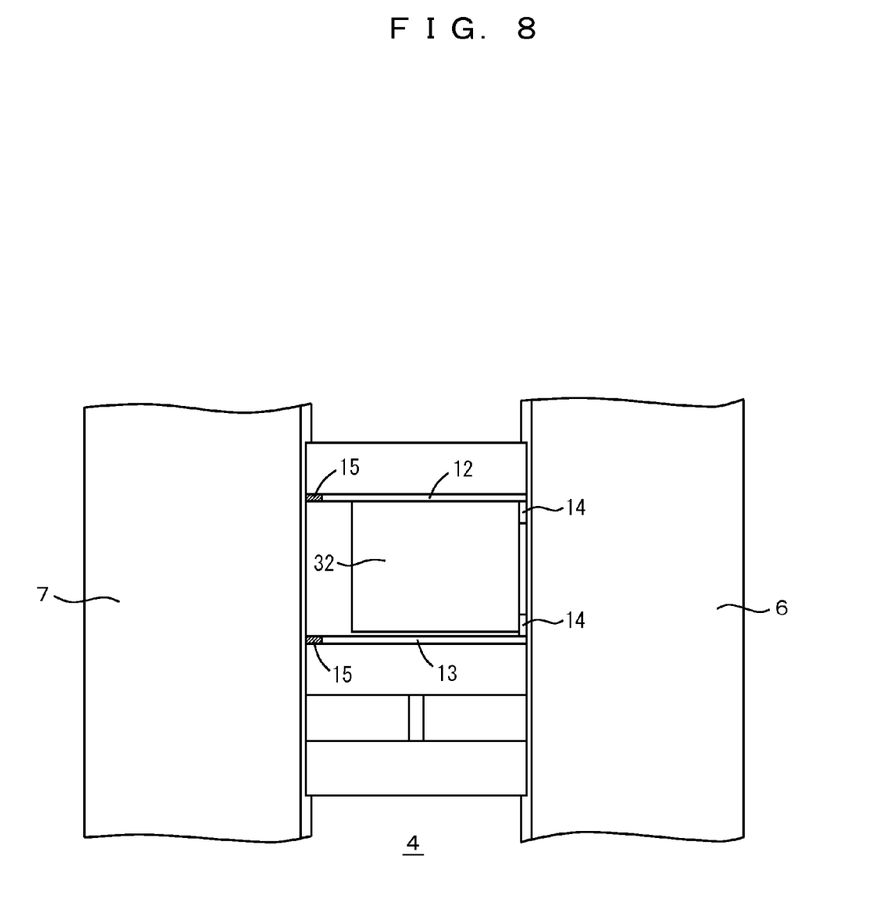
FIG. 8 is a plan view showing the article that has been pulled in onto the transfer vehicle.

After the top arms 12 and 13 have been positioned relative to the package 32 in the above-described manner, the spacing between the top arms 12 and 13 is slightly opened, for example, in an amount of about 3 mm to about 15 mm, thus providing a gap between the top arms 12 and 13 and the package 32 (FIG. 7). Then, retraction of the top arms 12 and 13 onto the transfer vehicle 4 as shown in FIG. 8 completes the article pickup. Note that the hooks 14 may be closed at any timing as long as they are closed before the start of retraction of the top arms 12 and 13. When article pickup is performed as described above, the package 32 does not get caught on the top arms 12 and 13, making it possible to prevent damage to the package 32 or damage to the top arms 12 and 13 and the like. Furthermore, the package 32 is nearly precisely positioned on the transfer vehicle 4.

Figure 9:
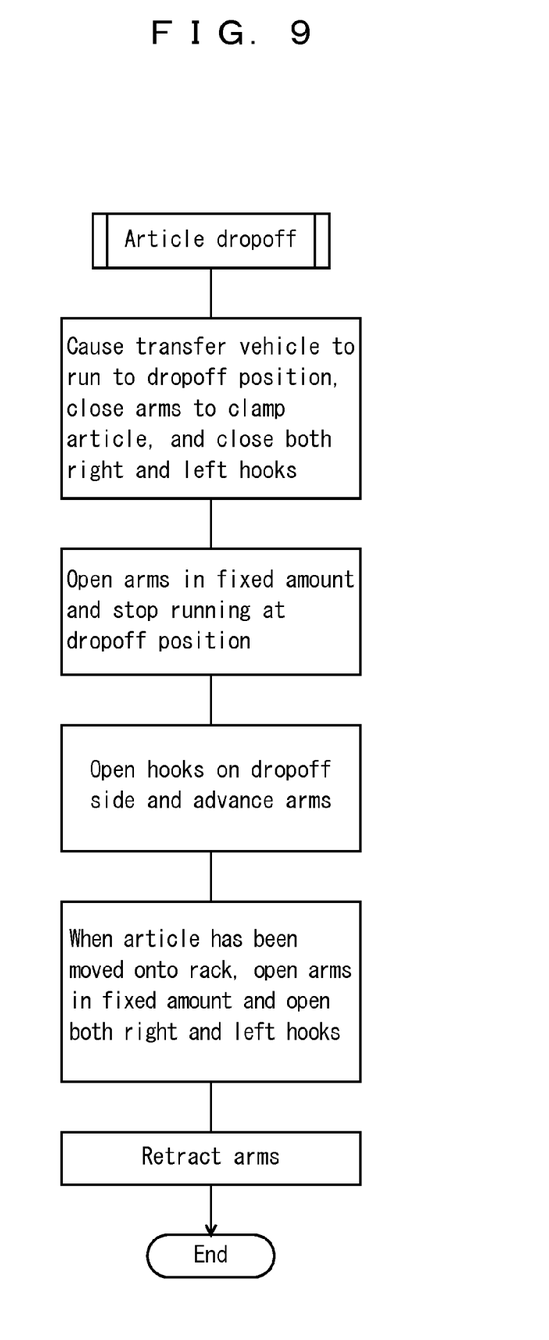
FIG. 9 is a flowchart illustrating an algorithm used for performing article drop off.
Figure 10:
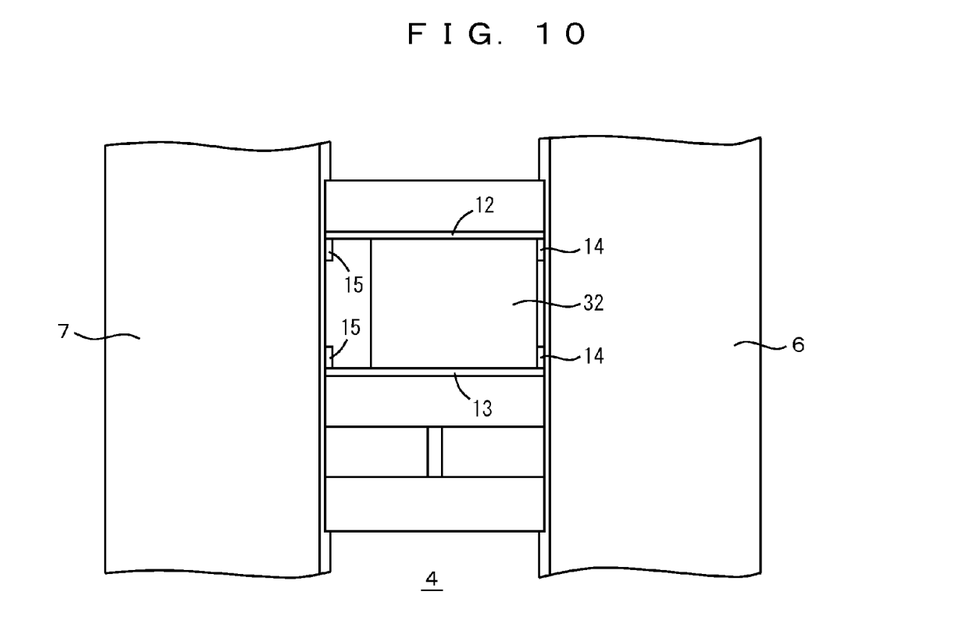
FIG. 10 is a plan view showing the article while the transfer vehicle is running.

FIG. 9 shows an algorithm used to perform article drop off, and FIGS. 10 to 13 schematically show an operation of the top arms 12 and 13 in the process of the drop off. Note that the algorithm shown in FIG. 9 is executed under control of the controller 26. Upon completion of article pickup, the transfer vehicle 4 runs to the drop off position. The position has been notified by the warehouse controller 28. To prevent the package 32 from swinging or protruding to the right or to the left from the transfer vehicle 4 during running, all the right and left hooks 14, 14, 15, and 15 are closed, and the top arm 13 is moved toward the package 32 so as to clamp the package 32 by the top arms 12 and 13.

Figure 11:
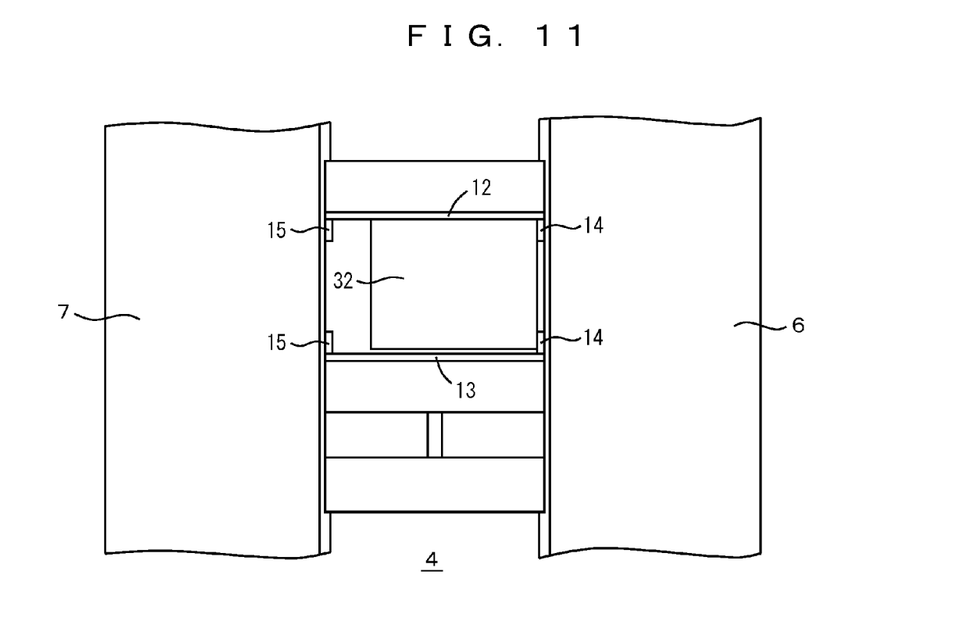
FIG. 11 is a plan view showing the transfer vehicle and the article that have stopped at a drop off position.
Figure 12:
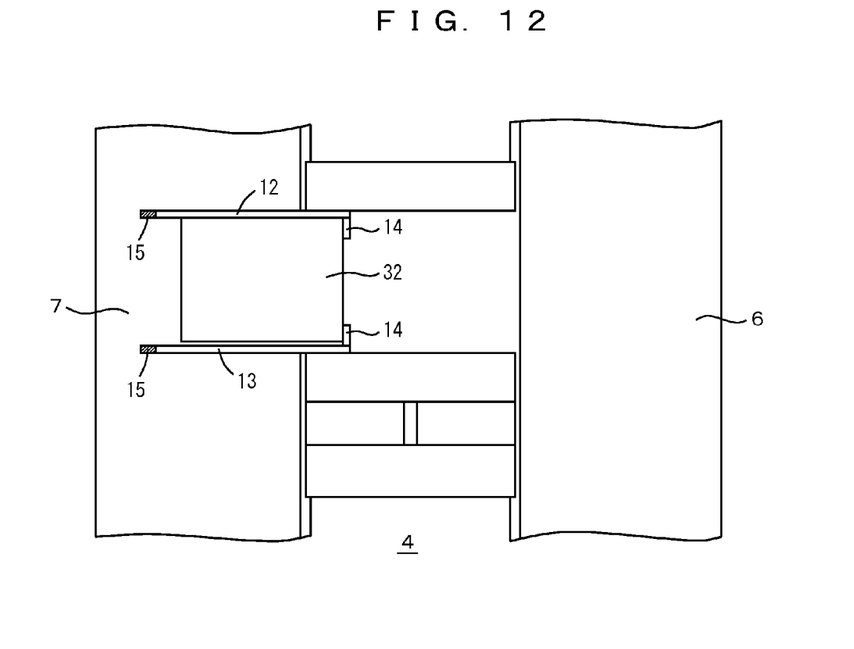
FIG. 12 is a plan view showing the article being dropped off from the transfer vehicle to a rack.

Immediately before the transfer vehicle 4 arrives at the drop off position, for example, after the transfer vehicle 4 has started decelerating in order to stop at the drop off position, more preferably when the transfer vehicle 4 has decelerated to a predetermined velocity or less, the top arm 13 is moved rearward in the running direction, thus providing a gap of, for example, about 3 mm to about 15 mm between the top arm 13 and the package 32 (FIG. 11). Then, the hooks 15 at the distal end in the drop off direction are opened, and the top arms 12 and 13 are moved in the drop off direction so as to protrude from the transfer vehicle 4 (FIG. 12). At this time, the spacing between the top arms 12 and 13 is slightly wider than the width of the package 32, and therefore the package 32 will not get caught on the top arms 12 and 13. Note that the hooks 15 at the distal end in the drop off direction may be opened, for example, before the top arms 12 and 13 start to retract, and more precisely, they may be opened before the hooks 15 have passed the position of the package 32 during retraction of the top arms 12 and 13.

Figure 13:
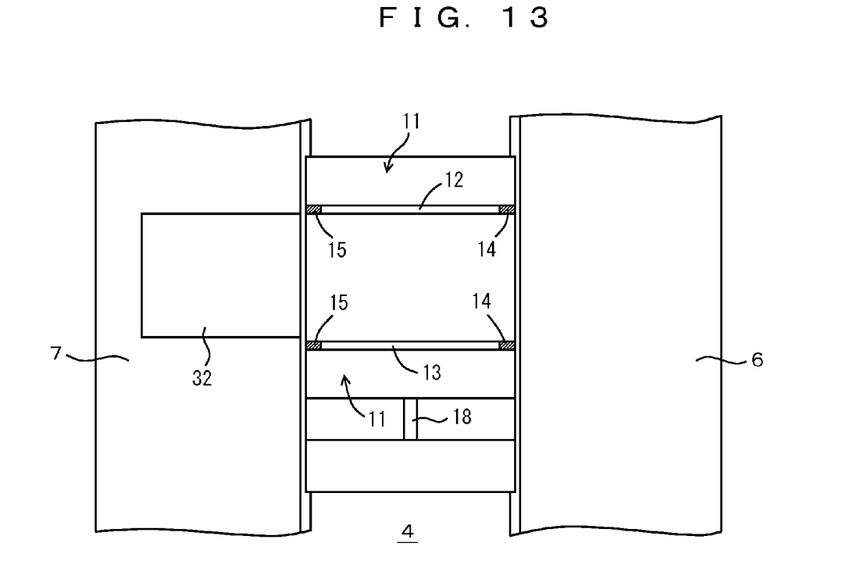
FIG. 13 is a plan view showing the article and the transfer vehicle after completion of the drop off.

When the package 32 has been moved to the rack 7 or the like where it is dropped off, for example, the top arms 12 and 13 are retracted onto the transfer vehicle 4 in a state in which the hooks 14 and 15 are opened. The hooks 14 may be either opened or closed as long as the position where the next article pickup is performed is in the same rack 7 where the previous article drop off was performed. If the position where the next article pickup is performed is the rack 6, which is on the opposite side from the position where the previous article pickup was performed, the hooks 14 are opened before the next article pickup operation, for example, concurrently with retraction of the top arms 12 and 13. The reason for this is that if the hooks 14 are opened when the hooks 14 are in contact with the package 32, there is the possibility that the hooks may rub against the package.

By performing the operation as described above, the package 32 will not get caught on the top arms 12 and 13 during article drop off. Since the package is clamped by the top arms 12 and 13 during running, the package does not undergo displacement or vibration. Furthermore, since the hooks 14 and 15 are closed, the package does not protrude from the transfer vehicle 4. Also, since the package that has been pre-positioned by clamping during running is dropped off, the package may be dropped off at a precise position, so that the position of the package will not be imprecise.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transfer vehicle comprising:
    a lateral pair of extendable and retractable arms, the arms each including hooks at front and rear ends of the arms, the hooks being openable and closable with respect to the arms;
    an arm opening and closing mechanism configured to change spacing between the arms; and
    a controller configured and programmed to control the arms, the arm opening and closing mechanism and the hooks, the controller being configured and programmed to, during article pickup:
        control the arms such that the arms are advanced so as to protrude from the transfer vehicle to a position where the hooks at a distal end pass the article, while controlling hooks at the distal end along a pickup direction as viewed from the transfer vehicle in a state in which the hooks are opened;
        control the arm opening and closing mechanism by closing the advanced arms so as to clamp the article and opening the arms after the clamping, such that a gap is provided between the article and at least one of the arms; and
        control the arms such that the arms are retracted, while controlling the hooks at the distal ends to be in a closed state in order to pull the article onto the transfer vehicle.

2. The transfer vehicle according to claim 1, wherein the controller is configured and programmed to control the arm opening and closing mechanism such that the article is clamped by the arms while the transfer vehicle is running.

3. The transfer vehicle according to claim 2, wherein the controller is configured and programmed to control the hooks at the front and rear ends such that the hooks are closed while the transfer vehicle is running.

4. The transfer vehicle according to claim 1, wherein the controller is configured and programmed to, during article drop off, control the arm opening and closing mechanism to provide a gap between at least one of the arms and the article, control the hooks at a proximal end along a drop off direction as viewed from the transfer vehicle in a state in which the hooks are closed, and control the arms such that the arms are advanced so as to protrude from the transfer vehicle.

5. The transfer vehicle according to claim 1, wherein the arm opening and closing mechanism includes an arm opening and closing motor.

6. The transfer vehicle according to claim 1, further comprising a hook opening and closing mechanism configured to open and close the hooks.

7. The transfer vehicle according to claim 6, wherein the hook opening and closing mechanism includes a hook opening and closing motor for each of the hooks.

8. A transfer method for transferring an article using a transfer vehicle comprising a lateral pair of extendable and retractable arms, hooks arranged at front and rear ends of each of the pair of arms and openable and closable with respect to the arms, and a controller, the method being performed under control of the controller and comprising the steps of:
   advancing, during article pickup, the arms so as to protrude from the transfer vehicle in a state in which the hooks at a distal end along a pickup direction as viewed from the transfer vehicle are opened, to a position at which the hooks at the distal end pass the article;
   subsequently closing the arms to clamp the article; and
   after the clamping, pulling the article onto the transfer vehicle by opening the arms to provide a gap between the article and at least one of the arms, and retracting the arms in a state in which the hooks at the distal end are closed.

9. The transfer method using a transfer vehicle according to claim 8, wherein during article drop off, a step for advancing the arms so as to protrude from the transfer vehicle in a state where a gap is provided between at least one of the arms and the article and where the hooks at a proximal end along a drop off direction as viewed from the transfer vehicle are closed is performed under control of the controller.

* * * * *